(12) United States Patent
Hayashida

(10) Patent No.: US 10,673,174 B2
(45) Date of Patent: Jun. 2, 2020

(54) DIGITAL MEASUREMENT INSTRUMENT

(71) Applicant: Mitutoyo Corporation, Kanagawa (JP)

(72) Inventor: Shuuji Hayashida, Kanagawa (JP)

(73) Assignee: Mitutoyo Corporation, Kanagawa (JP)

( * ) Notice: Subject to any disclaimer, the term of this patent is extended or adjusted under 35 U.S.C. 154(b) by 66 days.

(21) Appl. No.: 15/967,036

(22) Filed: Apr. 30, 2018

(65) Prior Publication Data

US 2018/0316120 A1   Nov. 1, 2018

(30) Foreign Application Priority Data

Apr. 28, 2017 (JP) ................................. 2017-089831

(51) Int. Cl.
| | |
|---|---|
| *G01B 3/20* | (2006.01) |
| *H01R 13/52* | (2006.01) |
| *G01B 3/18* | (2006.01) |
| *G01B 3/22* | (2006.01) |

(52) U.S. Cl.
CPC ............ *H01R 13/52* (2013.01); *G01B 3/205* (2013.01); *G01B 3/18* (2013.01); *G01B 3/22* (2013.01)

(58) Field of Classification Search
CPC ............ H01R 13/2414; H01R 13/5219; H01R 13/44; H01R 31/065; H01R 12/7076; G01B 3/205; G01B 3/18; G01B 3/002; G01B 21/047; G01B 2210/58; G08C 15/00; G01D 7/00
See application file for complete search history.

(56) References Cited

U.S. PATENT DOCUMENTS

| | | | | | |
|---|---|---|---|---|---|
| 6,105,269 | A  * | 8/2000 | Kondrat | ............... | A61B 5/4504 33/512 |
| 6,671,976 | B2 * | 1/2004 | Takahashi | .......... | H01R 13/2414 33/784 |
| 7,802,374 | B1 * | 9/2010 | Chen | ...................... | G01B 3/205 33/784 |
| 8,745,108 | B2 * | 6/2014 | Jansson | ................... | G06F 15/02 708/170 |
| 2015/0219431 | A1 * | 8/2015 | Jordil | ................... | G01B 21/047 33/701 |
| 2016/0123712 | A1 * | 5/2016 | Cook | ..................... | G01B 3/205 33/819 |

FOREIGN PATENT DOCUMENTS

| | | |
|---|---|---|
| JP | 2003-65747 | 3/2003 |
| JP | 2005-3441 | 1/2005 |
| JP | 2015-102457 | 6/2015 |

* cited by examiner

*Primary Examiner* — Brandi N Hopkins
(74) *Attorney, Agent, or Firm* — Oblon, McClelland, Maier & Neustadt, L.L.P.

(57) ABSTRACT

A digital measurement instrument with excellent environmental durability and at least a conventional level of usability including a main scale, a slider movable relative to the main scale, a displacement sensor configured to detect displacement or position of the slider in relation to the main scale, and a control circuit. The control circuit controls change between a normal measuring mode and an origin setting mode. The control circuit also sets and stores a first area, the first area being a preset predetermined range outside of a measurement range. The control circuit also changes operation mode from the normal measuring mode to the origin setting mode when the slider is detected to have stopped within the first area for a consecutive predetermined period of time. Additionally, the digital calipers are provided with no mechanical push button switches.

18 Claims, 6 Drawing Sheets

DIGITAL MEASUREMENT INSTRUMENT

CROSS-REFERENCE TO RELATED APPLICATIONS

This application claims priority under 35 U.S.C. § 119 from Japanese Patent Application No. 2017-089831, filed Apr. 28, 2017. The entire content of the above application is incorporated herein by reference.

TECHNICAL FIELD

The present invention relates to a digital measurement instrument.

BACKGROUND ART

Measurement instruments, such as calipers, micrometers, and dial indicators (test indicators), that are held by the hand of the user when measuring are known.

One such example is the conventional digital calipers illustrated in FIG. 1.

The digital calipers 10 are provided with a main scale (fixed member) 11 that includes a measuring jaw 12, a slider (moving member) 13 movable along the main scale 11, a depth bar 16 configured to move integrally with the slider 13 along the main scale 11, and an encoder (displacement detector) 17 configured to detect the amount of displacement of the slider 13 in relation to the main scale 11. The encoder 17 includes a scale 18 and a detector head 19 configured to detect displacement (or position) in relation to the scale 18. The scale 18 is provided on the main scale 11, and the detector head 19 is provided on the slider 13. Additionally, the back surface of the main scale 11 is provided with a groove (not illustrated) along the longitudinal direction. The depth bar 16 is housed in the groove. The depth bar 16 is configured to project from the end of the main scale 11 when the slider 13 moves.

The slider 13 includes a display unit 14 configured to digitally display information such as the measurement value detected by the encoder 17 and a plurality of mechanical push button switches 15 disposed around the display unit 14.

CITATION LIST

Patent Literature

Patent Document 1: JP 4516288 B
Patent Document 2: JP 2015-102457 A
Patent Document 3: JP 3831218 B

SUMMARY OF INVENTION

Technical Problem

Such digital measurement instruments are useful on sites, such as in factories, because of their portability. However, water, oil, dust, and the like exist in such work environments, making such environments non-conducive for the use of electronic devices. In light of this, in the related art, various digital measurement instruments having resistance to water (oil) are known (JP 4516288 B, JP 2015-102457 A, JP 3831218 B).

The mechanical push button switches 15 configured to be manually pushed down are particular problem areas in the water (oil) resistance configuration of the measurement instrument. The mechanical push button switches 15 are used for the operation of various settings and the like. However, the seal structure around the mechanical push button switches 15 necessitates an increase in the number of parts and in processing man-hours.

An object of the disclosure is to provide a digital measurement instrument with excellent environmental durability and at least a conventional level of usability.

Solution to Problem

A measurement instrument according to an aspect of the invention includes: a fixed member; a moving member movable relative to the fixed member; a displacement detector configured to detect displacement or position of the moving member in relation to the fixed member; and a control circuit unit; wherein
the control circuit unit includes a mode change control unit configured to control change between a first operation mode and a second operation mode;
the mode change control unit includes a first area setting storage unit configured to set and store a first area, the first area being a preset predetermined range outside of a measurement range, and
the mode change control unit is configured to change operation mode from the first operation mode to the second operation mode in a case that the moving member is detected to have stopped within the first area for a consecutive predetermined period of time.

Calipers according to an aspect of the invention include digital calipers, the digital calipers include:
a main scale; a slider movable relative to the main scale; a displacement detector configured to detect displacement or position of the slider in relation to the main scale; and a control circuit unit; wherein
the control circuit unit includes a mode change control unit configured to control change between a first operation mode and a second operation mode; the mode change control unit includes a first area setting storage unit configured to set and store a first area, the first area being a preset predetermined range outside of a measurement range, and the mode change control unit is configured to change operation mode from the first operation mode to the second operation mode in a case that the slider is detected to have stopped within the first area for a consecutive predetermined period of time.

In an embodiment of the invention, preferably the second operation mode is an origin setting mode; and the control circuit unit is configured to set as an origin a detection value from the displacement detector in a case that the detection value is detected to have stopped at an identical value within a measurement range for a predetermined period of time, after the operation mode is changed to the origin setting mode.

In an embodiment of the invention, preferably a mechanical push button switch is not provided.

DESCRIPTION OF EMBODIMENTS

Figure 2:
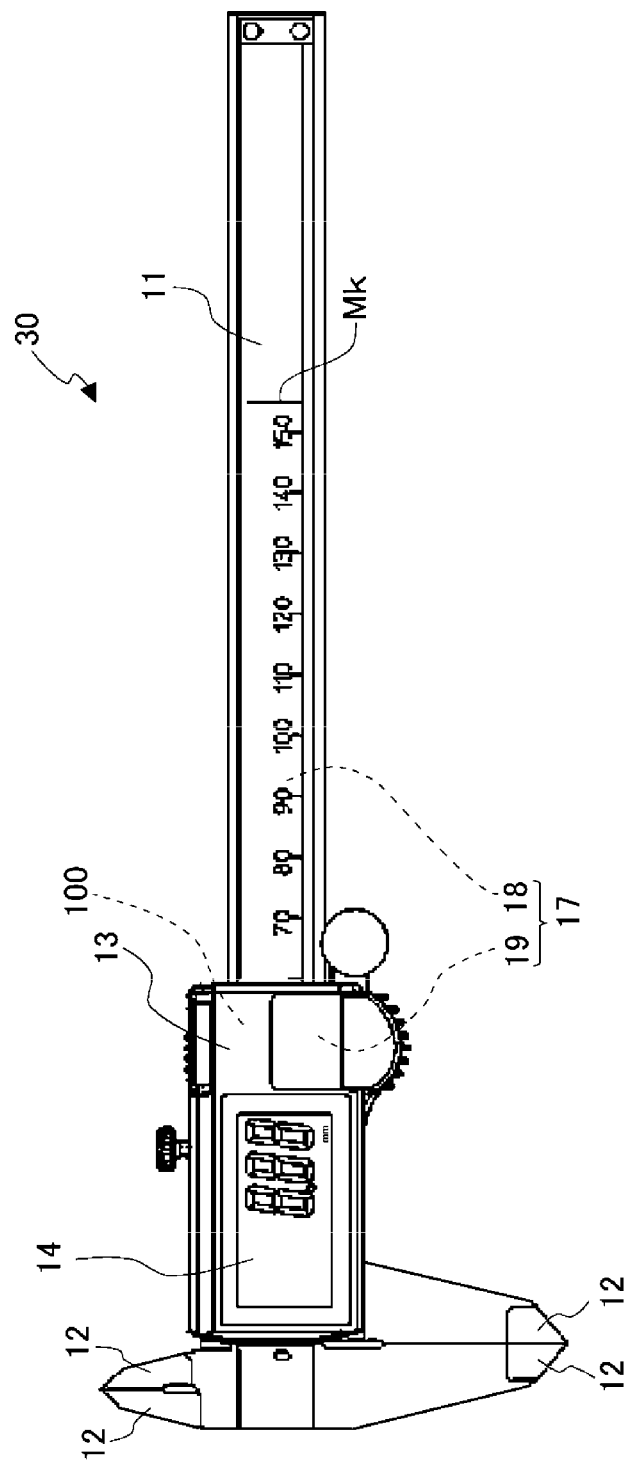
FIG. 2 is a drawing illustrating digital calipers according to the first embodiment.

An embodiment of the invention will now be described with reference to the drawings and the reference numerals appended to the elements illustrated in the drawings. FIG. 2 is a drawing of digital calipers 30 according to the present embodiment.

Figure 1:
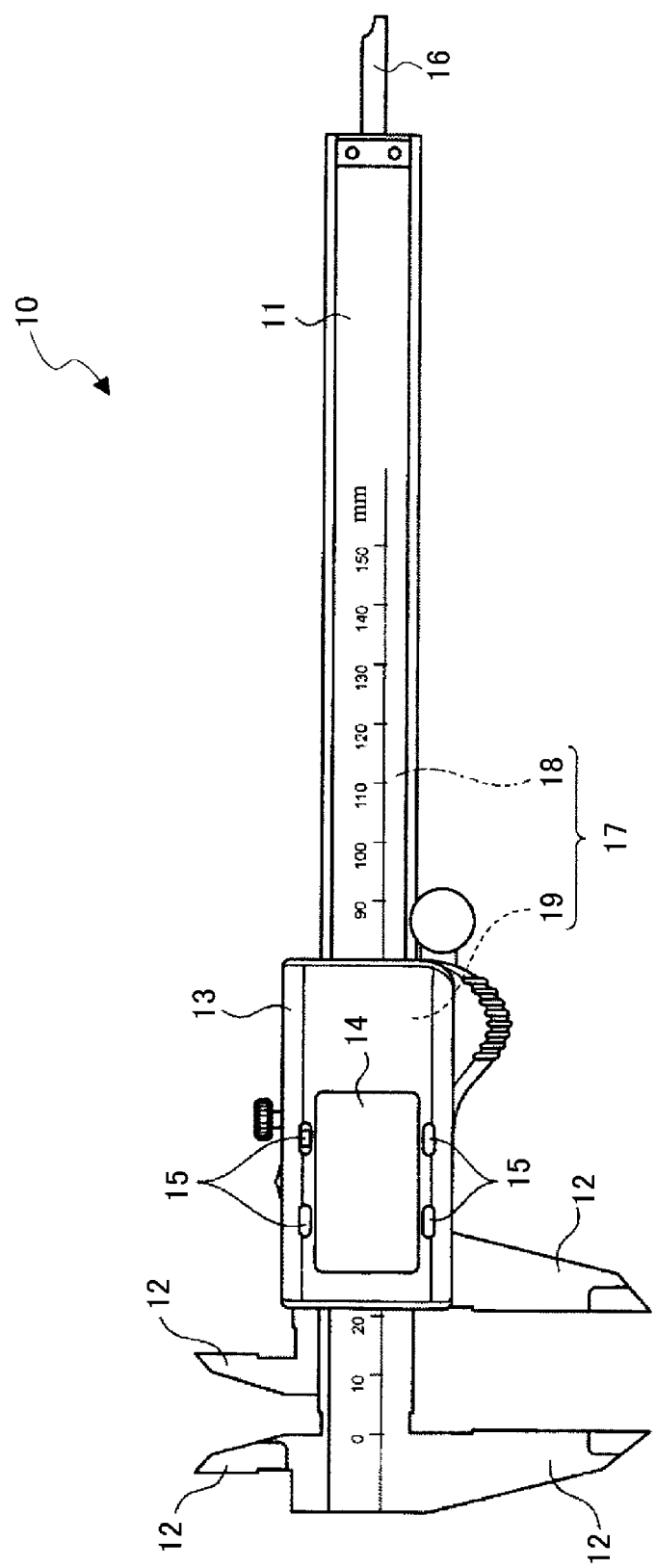
FIG. 1 is a drawing illustrating conventional digital calipers.

The basic configuration is identical to that of the digital calipers 10 illustrated in FIG. 1, thus corresponding elements are denoted with the same reference sign and redundant descriptions are omitted. However, the digital calipers 30 are switchless digital calipers 30 with the slider 13 being provided with no mechanical push button switches 15.

The slider 13 is equipped with a control circuit unit 100.

Figure 3:
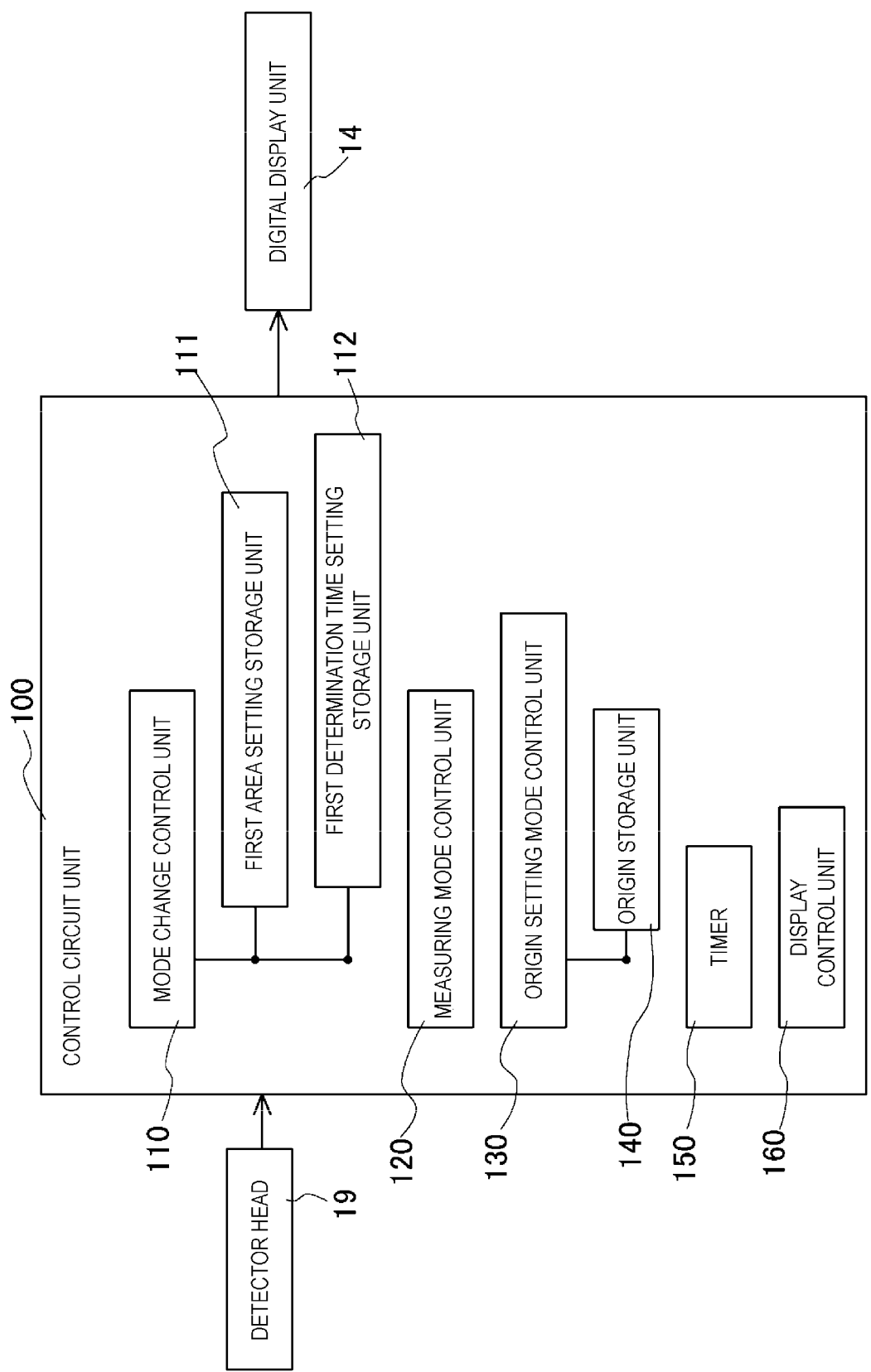
FIG. 3 is a function block diagram of a control circuit unit.

FIG. 3 is a function block diagram of the control circuit unit 100.

The control circuit unit 100 is a microcomputer including a central processing unit (CPU) and ROM and RAM stored with a predetermined program. The control circuit unit is configured to comprehensively control the operation of all of the switchless digital calipers 30. The microcomputer operates as the functional units described below via the execution of programs by the CPU. The control circuit unit 100 is provided with a mode change control unit 110, a first area setting storage unit 111, a first determination time setting storage unit 112, a measuring mode control unit 120, an origin setting mode control unit 130, an origin storage unit 140, a timer 150, and a display control unit 160.

Detailed operations of the functional units will now be described with reference to the flowchart described below.

Figure 4:
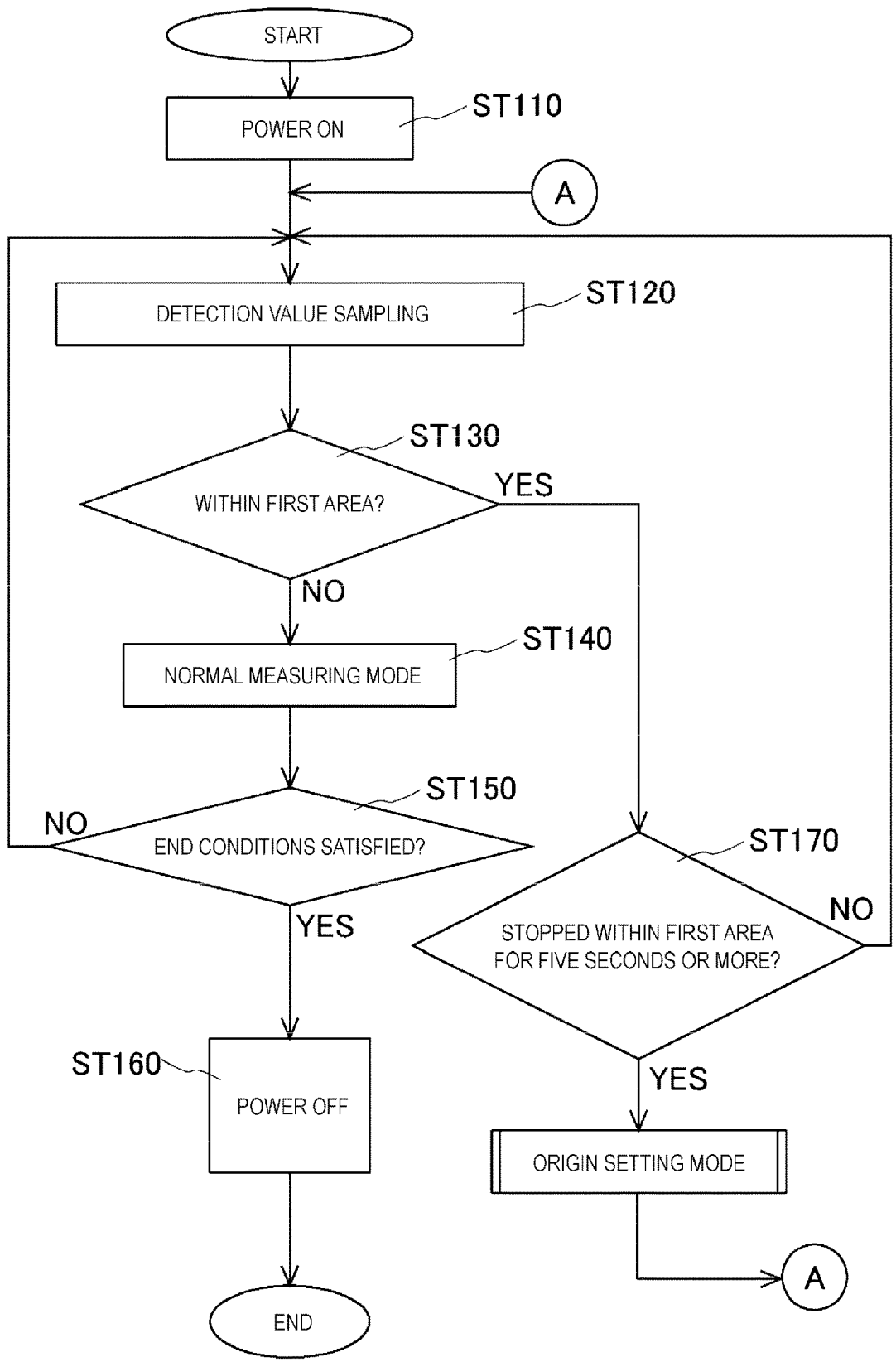
FIG. 4 is a flowchart for describing the operations of the control circuit unit.
Figure 5:
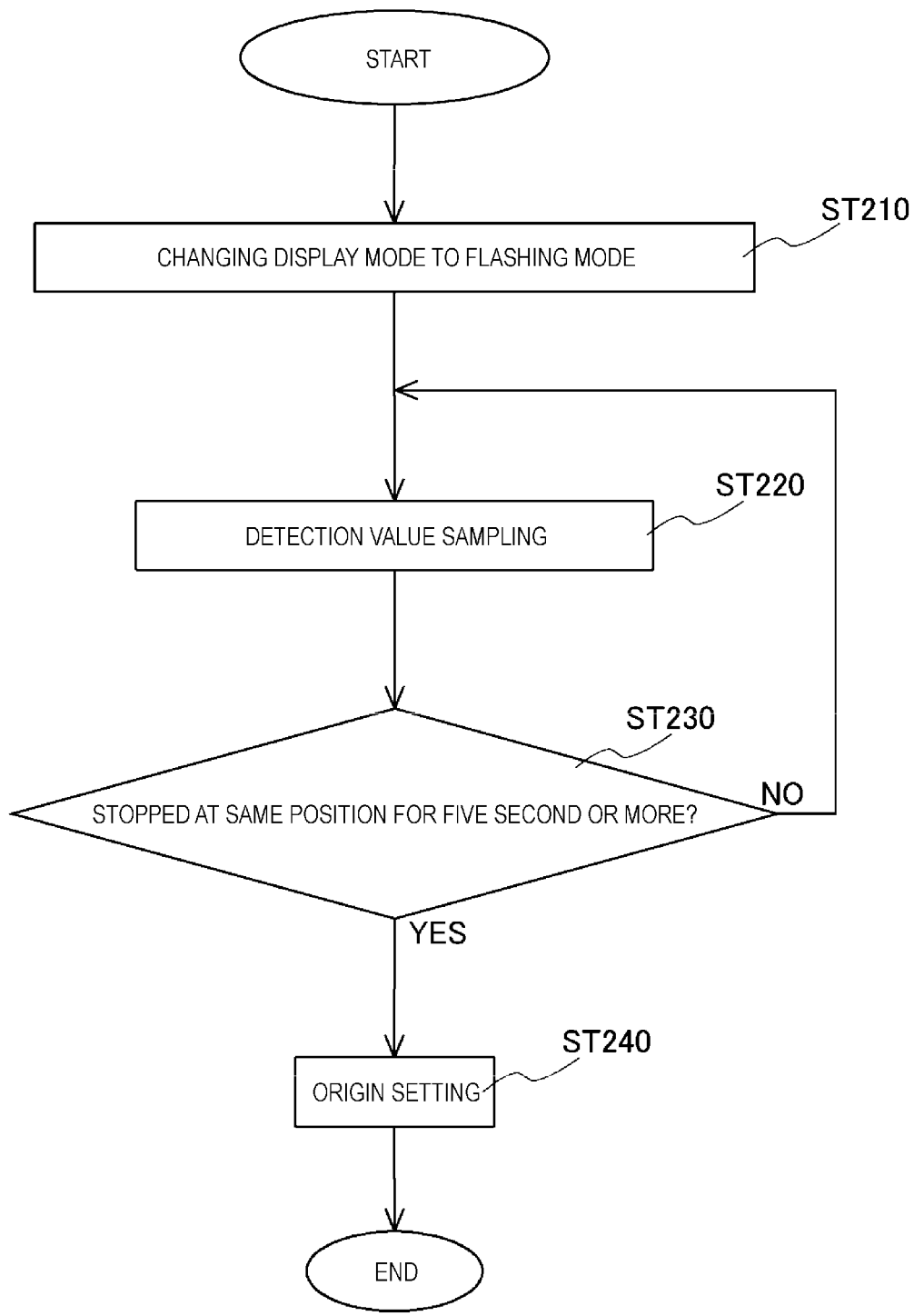
FIG. 5 is a flowchart for describing the operational procedure of the origin setting mode.

FIGS. 4 and 5 are flowcharts for describing the operations of the control circuit unit 100.

The switchless digital calipers 30 are provided with no mechanical push button switches 15 configured to turn the power on and off. Thus, an auto on function and an auto off function are preferably provided. In other words, the user moving the slider 13 automatically turns on the power (ST110).

Additionally, when the slider 13 is still for a certain length of time, the power automatically turns off (ST150, ST160).

After power is turned on (ST110), the control circuit unit 100 acquires a detection value Dp from the detector head 19 of the encoder 17 (ST120). After the detection value Dp is acquired, the mode change control unit 110 determines whether the detection value Dp is within a first area (ST130) and controls changing the operation mode of the switchless digital calipers 30 depending on the determination result.

Next, the first area setting storage unit 111 will be described.

The mode change control unit 110 is provided with the first area setting storage unit 111. The first area is preset and stored in the first area setting storage unit 111 as a predetermined range.

In the present embodiment, the first area is set to a range of from 150.01 to 155.00. The value of the first area is set to a value outside of the measurement range of the switchless digital calipers 30. In an example in which the measurement range of the switchless digital calipers 30 is from 0.00 mm to 150.00 mm, the first area is set to a value greater than 150.00.

Note that "measurement range" is defined in accordance with Japanese Industrial Standards JIS Z8103:2000—"Glossary of terms used in measurement, 4307 measuring range" as "the range of the measurand within a designated threshold of an instrument where error is suppressed", and is a range of values, for example, indicated in the product specifications for ensuring measurement accuracy.

As long as the scale 18 of the encoder 17 is provided with measurement lines, the detector head 19 detects the amount of displacement (or position) outside of the measurement range in relation to the scale 18. However, to ensure measurement accuracy of the measurement instrument, there is a restriction on the length of the scale 18 due to the scale 18 being susceptible to linear expansion or bending. The calipers need a "portion to hold", thus the length of the main scale 11 may be longer than needed for measuring, and the main scale may extend outside of the measurement range.

When the detection value Dp is outside of the first area (ST130: NO), the mode change control unit 110 does not change modes, remaining in the normal measuring mode. In other words, the detection value Dp is displayed on the display unit 14 as the measurement value via the control of the measuring mode control unit 120 (ST140).

The user does not move the slider 13 to the end of the main scale 11 unless due to a special volition. In particular, in the case of calipers, moving the slider 13 to the end of the main scale 11, makes the depth bar 16 project from the end of the main scale 11 a significant length (150 mm). Thus, the position of the slider 13 is normally within the measurement range during normal usage for measuring and when not used, such as when in storage.

Figure 6:
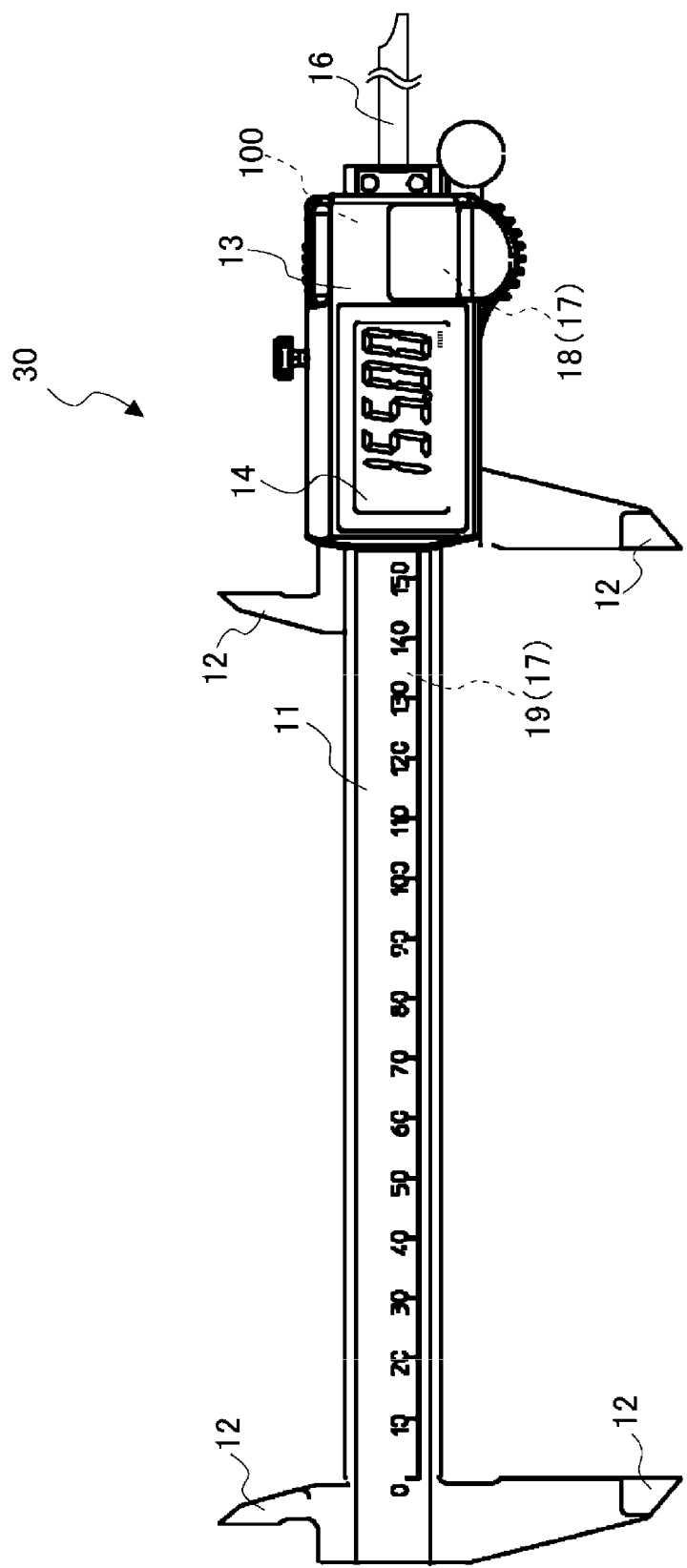
FIG. 6 is a drawing illustrating an example of how a mode changing operation works.

When the user wants to change modes, the slider 13 is moved outside of the measurement range, and the position of the slider 13 is adjusted to be within the first area (for example, see FIG. 6).

Here, the user may move the position of the slider 13 to within the first area while looking at the values displayed on the display unit 14. Alternatively, a mark (coloring, engraving, or the like) Mk that indicates the first area may be put on the main scale 11, and the user may align the position of the slider 13 (the position of the outer measuring jaw 12 of the slider 13) with the mark Mk. The mode change control unit 110 determines whether the detection value Dp is within the first area (ST130), and when the detection value Dp is a value within the first area (ST130: YES), the mode change control unit 110 monitors sampled detection values Dp and a time count of the timer 150 (ST170). When the detection value Dp is confirmed to have been a value within the first area for five consecutive seconds (ST170: YES), the mode change control unit 110 determines that the user changed modes, and changes the mode to the origin setting mode (ST200).

Here, the time setting value of "five seconds or more" is defined as the "first determination time", and the first determination time is preset in the first determination time setting storage unit 112.

Note that in this embodiment, the trigger for changing modes is the detection value Dp being a value within the first area for five consecutive seconds. However, in another embodiment, the trigger may not be a first determination time of five seconds or more and may start longer, for example ten seconds or more, or start shorter, for example two seconds or more.

FIG. 5 is a flowchart for describing the operational procedure of the origin setting mode.

When the mode is changed to the origin setting mode, the origin setting mode control unit 130 makes the display of the display unit 14 flash (ST210). In this embodiment, the display of the display unit 14 is made to flash to communicate to the user that the mode was changed. However, in another embodiment, the color of the display may change, or a mark or sign may be displayed on the display unit 14.

Next, the origin setting mode control unit 130 monitors sampled detection values Dp and the time count of the timer 150 (ST220, ST230), and waits for the detection value Dp to remain as the same value for five seconds.

When the user realizes that the mode has been changed to the origin setting mode (ST210), the user slides the slider 13 to calibrate the origin using a master work or a gauge block. Alternatively, to set the origin point at a set value, the user may move the slider 13 to the predetermined value while looking at the values displayed on the display unit 14, and bringing the slider 13 to rest.

When the detection value Dp is confirmed to have been the same value for five consecutive seconds (ST230: YES), the origin setting mode control unit 130 sets the detection value Dp as the origin in the origin storage unit 140. (This time (five seconds in this embodiment) is defined as the origin setting determination time.) The origin setting process ends, and the mode returns to the normal measuring mode.

In measuring operations thereafter, the difference from the origin is displayed on the display unit 14, thus allowing the measurement value of the processing error from the master work or design value to be obtained.

According to the first embodiment, the following effects are achieved.

(1) The digital calipers 30 of the present embodiment are provided with no mechanical push button switches 15. Thus, the concern of water and oil entering the electrical components from around the mechanical push button switch 15 is removed, and environmental durability is greatly increased. Additionally, being provided with no mechanical push button switches 15 allows the area of the display unit 14 to be maximized, thus improving visibility. Removing the mechanical push button switches from the slider 13 allows the slider 13 to be an integral formed component, thus reducing the number of parts and man-hours needed for assembly.

(2) As described above, the switchless digital calipers 30 retain the setting functions and level of usability required in measurement instruments. For calipers, it is extremely rare for the slider 13 to be moved outside of the measurement range during normal usage. Thus, the function of the present embodiment can be provided without causing concern in relation to erroneous operation. Also, to set the origin, the slider 13 need only be moved outside of the measurement range. As a result, greatly convenient operation is achieved, and high usability is maintained.

Modified Example 1

In the first embodiment described above, the calipers have two operation modes, the normal measuring mode and the origin setting mode. In another embodiment, the calipers may have a third operation mode. An example of the third operation mode includes, for example, an inch display mode which can be selected by the user to change the normal millimeter display to an inch display. Two examples of methods of changing from the normal millimeter display to the inch display will be described.

The first method includes establishing a second area as well as the first area. In an embodiment in which the second area is established at a position different from that of the first area, when the slider 13 is detected to have stopped within the second area for a predetermined period of time, the mode change control unit 110 determines that a command was received to change the mode to the inch display mode. The second area is a position outside of the measurement range and different from that of the first area. For example, the first area may be set from 150.01 to 152.00, and the second area may be set from 152.01 to 155.00.

The second method includes establishing a second determination time as well as the first determination time.

In this embodiment, the first determination time is set to "from five seconds or more to less than ten seconds" and the second determination time is set to "10 seconds or more." When the slider 13 is detected to have stopped within the first area for five seconds or more, the mode change control unit 110 firstly changes to the origin setting mode, then when the slider 13 remains in the first area outside of the measurement range for 10 seconds, the change to the origin setting mode is canceled, and the operation mode is changed to the inch display mode.

In this way, more operation modes can be compensated for by using combinations of the area setting and the determination time setting for mode change commands.

The invention is not intended to be limited to the above-described embodiment, and appropriate variations can be made thereon without departing from the essential spirit of the invention.

"Outside of the measurement range" will be further described. Some calipers (measurement instruments) may not have a specified "accuracy ensured range", i.e., "measurement range". In such a case, "outside of the measurement range" may be understood as a range from the end of the main scale to approximately 50 mm from the end. For calipers, the main scale is a scale as well as a held portion (handle), and even without a specified range, the portion from the end of the main scale to 50 mm from the end is typically considered to be not used in measurement.

In the embodiments described above, an example of calipers "provided with no mechanical push button switches" was given. However, the invention is also applicable to configurations with a mechanical push button switch 15.

Additionally, an embodiment in which the calipers include the display unit 14 was given. However, the display unit 14 is not required to be provided on the calipers themselves. For example, a monitor separate from the calipers may be prepared, and the calipers and the monitor may be connected via wireless communication. (In such an embodiment, the calipers and the monitor are preferably equipped with a wireless communication unit). In other words, the calipers are without a mechanical push button switch and a display unit, and digital calipers with high environmental durability can be provided.

In the embodiments described above, an example using calipers was given. However, the invention is also applicable to micrometers and dial indicators (test indicators).

REFERENCE SIGNS LIST

10, 30 Digital calipers
11 Main scale
12 Measuring jaw
13 Slider
14 Display unit
15 Mechanical push button switch
16 Depth bar
17 Encoder
18 Scale
19 Detector head
100 Control circuit unit
110 Mode change control unit 111 First area setting storage unit
112 First determination time setting storage unit
120 Measuring mode control unit
130 Origin setting mode control unit
140 Origin storage unit
150 Timer
160 Display control unit

The invention claimed is:

1. A measurement instrument, comprising:
a fixed member;
a moving member movable relative to the fixed member;
a displacement sensor configured to detect displacement or position of the moving member in relation to the fixed member; and
a control circuit; wherein
the control circuit is configured to
control change between a first operation mode and a second operation mode,
set and store a first area, the first area being a preset predetermined range outside of a measurement range, and
change an operation mode from the first operation mode to the second operation mode when the moving member is detected to have stopped within the first area for a consecutive predetermined period of time.

2. Digital calipers, comprising:
a main scale;
a slider movable relative to the main scale;
a displacement sensor configured to detect displacement or position of the slider in relation to the main scale; and
a control circuit configured to
control change between a first operation mode and a second operation mode,
set and store a first area, the first area being a preset predetermined range outside of a measurement range, and
change an operation mode from the first operation mode to the second operation mode when the slider is detected to have stopped within the first area for a consecutive predetermined period of time.

3. The digital calipers according to claim 2, wherein
the second operation mode is an origin setting mode, and
the control circuit is further configured to set, as an origin, a detection value from the displacement sensor when the detection value is detected to have stopped at an identical value within a measurement range for a predetermined period of time, after the operation mode is changed to the origin setting mode.

4. The digital calipers according to claim 3, wherein a mechanical push button switch is not provided.

5. The digital calipers according to claim 2, wherein a mechanical push button switch is not provided.

6. The digital calipers according to claim 2, further comprising:
a display device configured to display a result based on a detection by the displacement sensor.

7. The digital calipers according to claim 2, further comprising:
a wireless transmitter configured to transmit a result based on a detection by the displacement sensor.

8. The digital calipers according to claim 2, wherein the first operation mode is a metric units operation mode.

9. The digital calipers according to claim 8, wherein the second operation mode is an imperial units operation mode.

10. The digital calipers according to claim 2, wherein the first operation mode is a origin setting operation mode.

11. The digital calipers according to claim 10, wherein the second operation mode is a measurement operation mode.

12. The digital calipers according to claim 2, wherein the control circuit is further configured to control change between the first operation mode, the second operation mode, and a third operation mode.

13. The digital calipers according to claim 2, wherein the consecutive predetermined period of time is 2 seconds or more.

14. The digital calipers according to claim 2, wherein the consecutive predetermined period of time is 5 seconds or more.

15. The digital calipers according to claim 2, wherein the consecutive predetermined period of time is 10 seconds or more.

16. The digital calipers according to claim 2, wherein the first area is set to a value greater than 150.00 mm.

17. The digital calipers according to claim 16, wherein the measurement range is between 0.0 mm and 150.00 mm.

18. The digital calipers according to claim 2, wherein the first area is set to a range of from 150.01 to 155.00.

* * * * *